US006266785B1

(12) United States Patent
McDowell

(10) Patent No.: US 6,266,785 B1
(45) Date of Patent: Jul. 24, 2001

(54) FILE SYSTEM FILTER DRIVER APPARATUS AND METHOD

(75) Inventor: Steven R. McDowell, Lexington, SC (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/144,753

(22) Filed: Sep. 1, 1998

(51) Int. Cl.[7] .......................... H02H 3/05; H03K 19/003
(52) U.S. Cl. ..................................... 714/11; 714/13
(58) Field of Search .............................. 714/11, 12, 13, 714/10; 707/10, 204, 205

(56) References Cited

U.S. PATENT DOCUMENTS

| 5,089,958 | * | 2/1992 | Horton et al. | 714/13 |
| 5,157,663 | | 10/1992 | Major et al. | 371/9.1 |
| 5,276,867 | * | 1/1994 | Kenley et al. | 714/22.81 |
| 5,513,314 | | 4/1996 | Kandasamy et al. | 395/182.04 |
| 5,564,011 | * | 10/1996 | Yammine et al. | 714/15 |
| 5,594,863 | | 1/1997 | Stiles | 395/182.13 |
| 5,668,958 | | 9/1997 | Bendert et al. | 395/308 |
| 5,675,723 | | 10/1997 | Ekrot et al. | 395/182.02 |
| 5,696,895 | | 12/1997 | Hemphill et al. | 395/182.02 |
| 5,950,203 | * | 9/1999 | Stakuis et al. | 707/10 |
| 6,078,990 | * | 6/2000 | Frazier | 711/114 |
| 6,105,122 | * | 8/2000 | Muller et al. | 712/1 |

* cited by examiner

Primary Examiner—Dieu-Minh Le
(74) Attorney, Agent, or Firm—Steven J. Adamson; James M. Stover

(57) ABSTRACT

A computing apparatus that is capable of taking over processing from a primary computer. The computing apparatus includes a confirmation-based file system cache flush mechanism that prevents loss of uncommitted data during a primary computer failure and a filter driver that is capable of functioning as a network file system driver in a first mode of operation and as an invisible pass through to the underlying local file system driver in a second mode of operation. A computer system that includes a primary and a secondary computer that have these features is also disclosed.

11 Claims, 3 Drawing Sheets

FILE SYSTEM FILTER DRIVER APPARATUS AND METHOD

FIELD OF THE INVENTION

The present invention relates to computer systems and, more specifically, to the transfer (or "fail-over") of processes from a primary computer to a secondary computer during failure of the primary computer.

BACKGROUND OF THE INVENTION

A primary computer may be any computer that is the preferred application server in a group of two or more computers. A secondary computer may be any computer that takes over or provides "fail-over" protection for a failing primary computer. The secondary computer typically receives the physical file system, network identity and executing applications of the primary during a fail-over. Prior to fail-over, the secondary computer may be both an application processor and a standby computer or simply a standby computer.

In some paired, clustered or networked primary and secondary computer arrangements, the physical storage media may be a shared physical volume such as arbitrated and lockable shared disks. In other arrangements, the physical storage media for the primary and secondary computers may be separate physical volumes and include a network based file system volume replication scheme where the contents of the file system stored on the primary physical storage media is also copied to the secondary physical storage media. Representative primary and secondary computer arrangements include those described in U.S. Pat. No. 5,696,895, issued to Hemphill et al for Fault Tolerant Multiple Network Servers, U.S. Pat. No. 5,675,723, issued to Ekrot et al for Multi-Server Fault Tolerance Using In-Band Signaling and U.S. Pat. No. 5,157,663, issued to Major et al for a Fault Tolerant Computer System, as well as those commercially available from NCR Corporation (product name "LifeKeeper") and Microsoft Corporation (product name "MS Cluster Server"). A network based file system volume replication scheme is also commercially available from NCR Corporation, assignee of the present application, under the product name "Extended Mirroring".

While prior art fail-over schemes have beneficial aspects they also have disadvantageous aspects. One disadvantageous aspect is that a secondary computer cannot reliable access data within the cache or like memory of a failing primary computer. During conventional processing there is almost always data in the cache waiting to be written to the physical storage media. This data which often includes uncommitted or unwritten file system transactions is lost during failure of the primary computer (often resulting in file corruption and difficult or impossible system recovery).

Another disadvantageous aspect of prior art fail-over schemes relates to the transfer of computer identity. If the secondary machine is part of a cluster or network or the like and data processed by an application executing on the secondary computer is stored via a network file system owned by the primary computer, then the transfer of the network file system results in the secondary computer aliasing to the primary computer and a re-aliasing back to the secondary computer. This may cause irrational behavior in the network file system on the secondary computer during and after fail-over.

Hence a need exists to provide a manner of achieving fail-over from a primary to a secondary computer that protects data in the cache or like memory of the primary and permits the secondary computer to readily adopt the identity of the primary computer.

SUMMARY OF THE INVENTION

Accordingly, it is an object of the present invention to provide a computing device that is capable of taking over processing from another computing device in such a manner that data in the file system cache or like memory of the failing computing device is not lost.

It is another object of the present invention to provide a computing device with a filter driver that performs network file system transfers in a non-fail-over mode and switches to local file system transfers in a fail-over mode.

It is also an object of the present invention to provide a fail-over computing device that receives a physical media transfer confirmation before flushing corresponding data from its file system cache.

These and related objects of the present invention are achieved by use of a file system filter driver apparatus and method as described herein.

In one embodiment, the present invention provides within a computing device a file system filter driver that exists above the operating system's file system layer. This filter driver operates as a file system cache coherent network file system in normal mode, and after fail-over acts as a passive pass-through driver to the underlying physical file system. A file system cache flush algorithm is also preferably provided in conjunction with the filter driver so that network file system data transfers are not lost during a primary computer failure.

The attainment of the foregoing and related advantages and features of the invention should be more readily apparent to those skilled in the art, after review of the following more detailed description of the invention taken together with the drawings.

DETAILED DESCRIPTION

Figure 1:
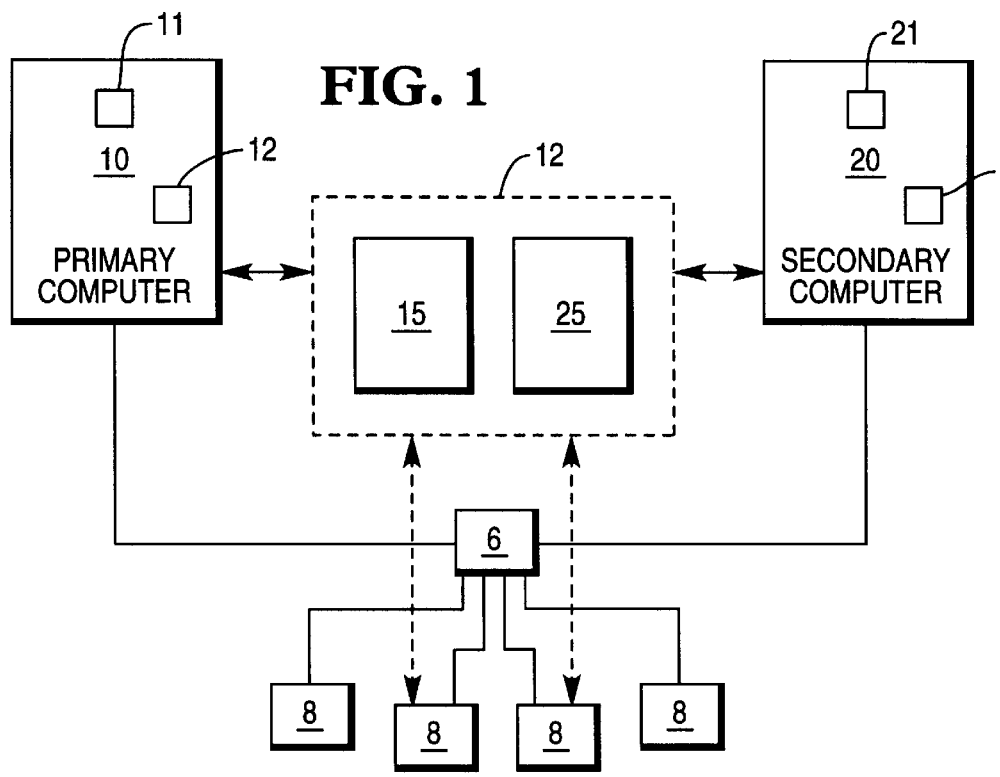
FIG. 1 is a diagram of clustered or networked computers having a primary and secondary computer in a fail-over pair arrangement in accordance with the present invention.

Referring to FIG. 1, a diagram of clustered or networked computers having a primary and secondary computer 10,20 in a fail-over pair arrangement in accordance with the present invention is shown. Primary computer 10 is the preferred application server of the pair and secondary computer 20 preferably provides fail-over protection for the primary computer. The primary computer includes a processor 11 and file system cache memory 12, amongst other conventional computer components, and the secondary computer similarly includes a processor 21 and file system cache memory 22, amongst other conventional components. As shown, the primary and secondary computers are coupled through a router or switch 6 to a plurality of other computers 8, one or more of which may be tiered secondary computers or the like.

It should be recognized that the primary and secondary computer arrangements described herein are applicable to all computer arrangements that have a primary or preferred application server computer and a secondary or fail-over computer, regardless of whether the computers are networked with other computers, in a redundant or non-redundant computer pair or otherwise clustered or combined. Furthermore, the physical storage media may be shared such as a shared disk drive 12 or implemented with a file mirroring replication scheme utilizing a primary physical storage media 15 and a secondary physical storage media 25, or other suitable storage media. In file mirror replication schemes, data stored on storage media 15 is mirrored on storage media 25 such that secondary computer 20 can readily assume the identity of primary computer 10 and carry on the application programs that primary computer 10 was executing at the time of failure.

As alluded to above, during fail-over problems exist assuring the survivability of uncommitted or unwritten file system data or the like and in establishing the apparent identity of the failed primary computer in the secondary computer. To alleviate these problems an appropriate filter driver and related operating system attributes are preferably provided in the secondary computer (or other computer in a tiered fail-over environment).

Figure 2:
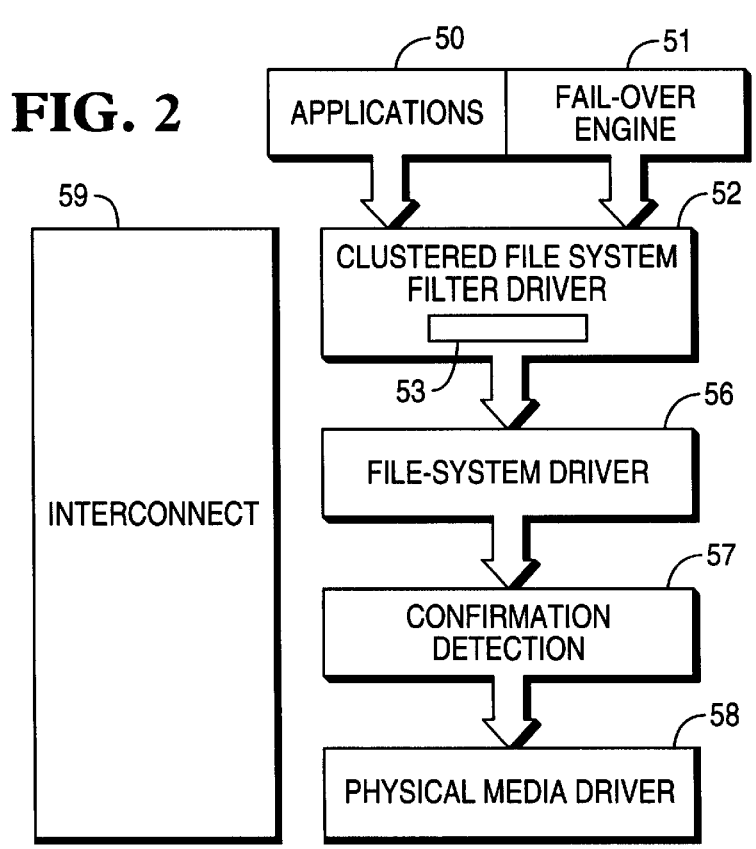
FIG. 2 is a diagram of operating system hierarchy and the location of a filter driver therein in accordance with the present invention.

Referring to FIG. 2, a diagram of operating system hierarchy within a computer (10,20) and the location of a filter driver therein in accordance with the present invention is shown. Block 50 represents application software, block 51 represents a conventional fail-over engine, block 52 represents a clustered file system filter driver, block 56 represents a file system driver, block 57 represents a confirmation detection function and block 58 represents the driver of physical storage media 15,25. Interconnect block 59 represents interconnection via a network.

As illustrated in FIG. 2, filter driver 52 preferably exists in a layer between the application software and the file system driver and other drivers in the operation system. In this manner, the filter driver may manipulate data before it is passed to underlying layers. Modern operation systems allow for layered driver arrangements as is known. The diagram of FIG. 2 illustrates the location of the clustered file system filter driver within a typical driver stack on a Windows NT server system.

Filter driver 52 preferably incorporates a network file system engine 53 such as CIFS/SMB for Windows NT which allows the secondary computer to communicate with the file system software on the primary through normal operation system channels. Standard network file system technologies are preferably used to allow the underlying file system model of locking and synchronization to be used without any enhancement.

Figure 3:
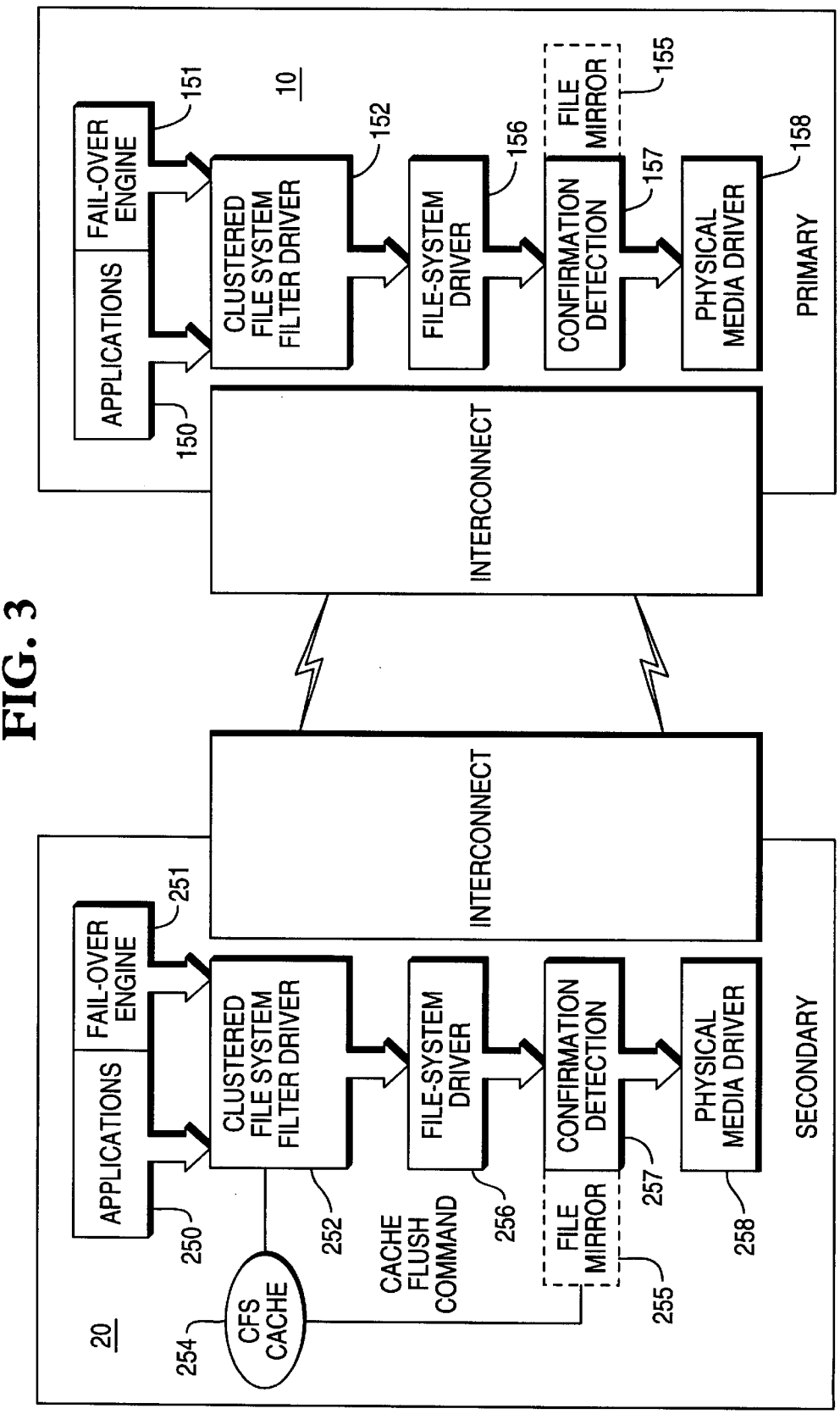
FIG. 3 is a diagram of operating system hierarchy and cache memory protection for a fail-over implementing computer cluster in accordance with the present invention.

Referring to FIG. 3, a diagram of operating system hierarchy and cache memory protection for a fail-over implementing computer cluster in accordance with the present invention is shown. FIG. 3 illustrates a plurality of computers 10,20 having operating system hierarchies as illustrated in FIG. 2. In a preferred embodiment, all computers within a cluster are loaded with software that implements the fail-over function described herein, hence the hierarchies of the various machines appear similar (like components have reference numerals with the same tens and ones unit and a different hundreds unit). After (or during) loading, however, the computers are configured to establish at least one primary computer 10 and one secondary computer 20. Note that there may be many secondary computers, mutual primary-secondary computer arrangements, tiered secondary computers, etc. The clustered file system filter driver features described herein are preferably not enabled or configured for the primary computer, but are present so that the primary computer may be used as a secondary computer should the need arise. For clarity of description and general pedagogical purposes, the operation of one primary computer and one secondary computer are described with reference to FIG. 3. It is to be understood, however, that other computer arrangements (for example, those alluded to above amongst others) may be implemented that utilize the fail-over provisions described herein and these other computer arrangements are within the scope of the present invention.

Operation of the computers of FIG. 3 is now described with a shared disk arrangement being described first followed by description of a file mirroring arrangement. With respect to applications being processed on the secondary computer, in non-fail-over mode data to be written to disk is both (1) temporarily stored in the secondary computer's file system cache memory 22 and (2) transferred via a conventional network file system engine to the primary computer for storage. At the primary computer, the data is processed by the primary computer's file system driver 156 and written by physical storage media driver 158 to the storage media (12 for shared and 15 for mirrored). Once the subject data has been successfully written to the storage media, confirmation logic or driver 157 propagates an appropriate write confirmation signal to confirmation logic or driver 257 within secondary computer 20. Upon receipt of the write confirmation signal, confirmation driver 257 invokes a file system cache flush algorithm (represented by block 254) that flushes the subject data from the secondary computers file system cache memory 22.

If the primary computer fails before the subject data is successfully written to the physical storage media owned by the primary computer, then in prior art systems this data is lost. Making use of the cache flush algorithm to retain data until writes to a physical media are confirmed eliminates the loss of this data.

With respect to file mirroring implementations, blocks 155,255 (adjacent confirmation drivers 157,257) represent this function. When data is to be written to physical storage media 15, file mirroring logic 155 implements the replication of this data to a mirrored physical storage media (such as drive 25 associated with or owned by the secondary computer). After a successful write to both physical storage media 15 and physical storage media 25, a confirmation signal is generated by the respective confirmation logic units 157,257 that results in a flush of the subject data from the secondary computer's file system cache memory 22.

When a primary computer fails, however, the primary computer is not able to send back a confirmation signal. In conjunction with a time-out for the confirmation signal and other conventional test signals, the secondary computer can ascertain when a primary computer failure has occurred. In response to detecting a primary computer failure, the secondary computer assumes the identity of the primary computer. This entails adopting the primary computer's network file system identity and related conventional fail-over processing. The file system filter driver 252 reconfigures itself through a software implemented switch to support local file system data transfers as opposed to network file system data transfers. In this manner, filter driver 252 supports both (1) the retention of uncommitted file system cache memory data and (2) filter driver mediated identity transfer from a primary computer to a secondary computer. In other words, if there are outstanding file system transactions in the secondary computer's file system cache, then these transactions are written through the secondary computer's underlying file system to the physical storage media associated therewith (shared or mirrored).

In addition, the path through the filter driver is reconfigured to pass file system transactions to the underlying physical file system, and not through to the network file system protocol engine.

Figure 4:
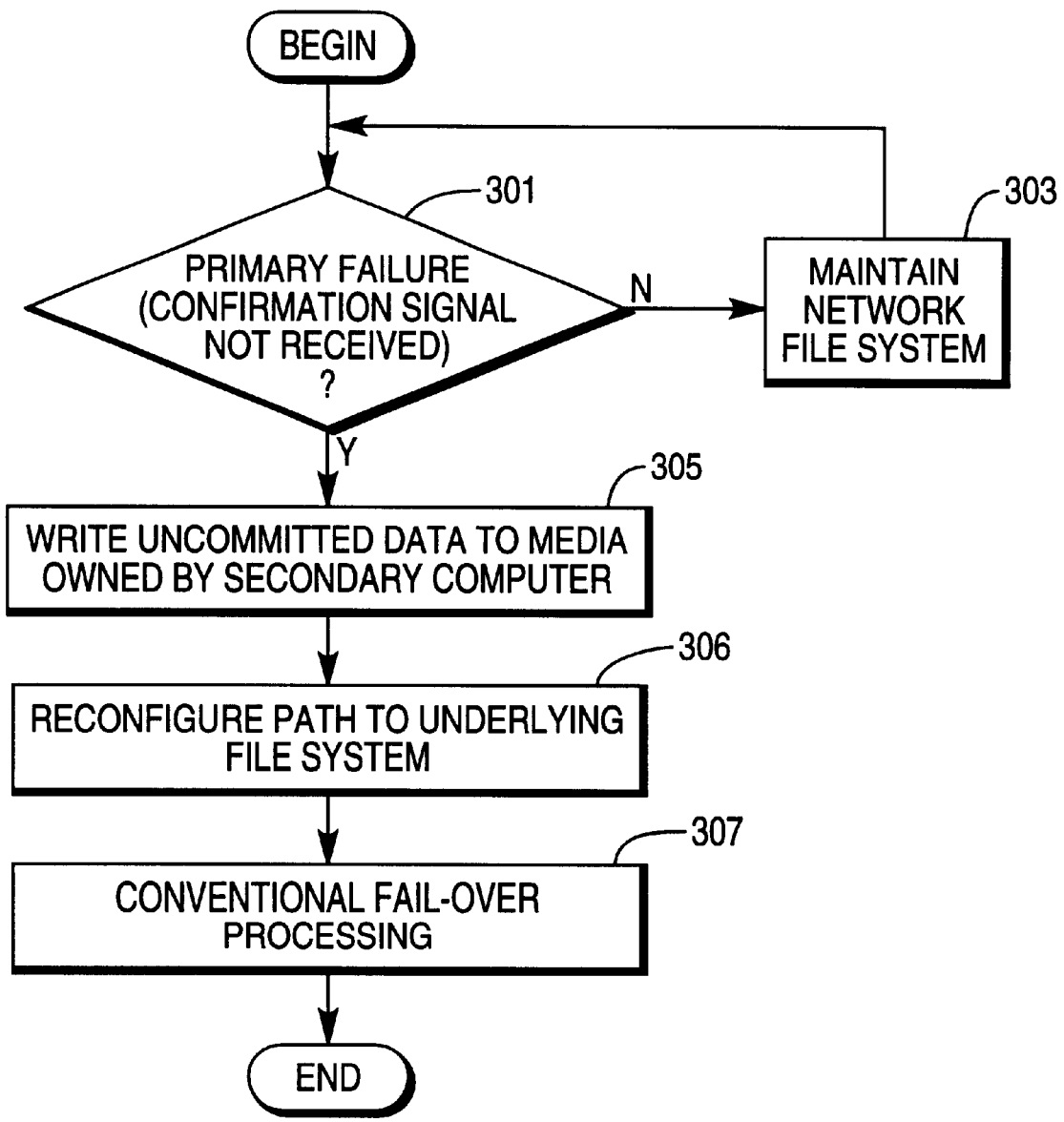
FIG. 4 is a flow diagram of software functions within the computer cluster of FIG. 3 in accordance with the present invention.

Referring to FIG. 4, a flow diagram of software functions within the computer cluster of FIG. 3 in accordance with the present invention is shown. In step 301 a determination is made as to whether a primary computer failure has occurred. If a failure has not occurred, then the operation of the filter driver 252 is unchanged (step 303). If a failure has occurred, then uncommitted data is written to the physical storage media owned by the secondary (step 305), the filter driver switches from network file system operation to local file system operation (step 306) and conventional fail-over and identity assuming processing is performed (step 307). It should be recognized that the processing of steps 305–307 is not necessarily serial in the manner portrayed diagrammatically.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A computing apparatus, comprising:
   processing logic;
   a file system cache memory coupled to said processing logic;
   a layered driver operating system implemented by said processing logic;
   a network adapter mechanism coupled to said processing logic to permit said computing apparatus to communicate with another computing apparatus;
   a file system filter driver, included within said layered driver operating system, that is capable of performing a software implemented switch between a first mode in which data storage is achieved using a network file system transfer and a second mode in which data storage is achieved using a local file system transfer;
   a mechanism for receiving a successful memory write confirmation signal from another computing apparatus;
   failure detecting logic that detects failure in another computing apparatus that owns a network file system through which data from said computing apparatus is stored in said first mode of operation; and
   fail-over invoking logic that in response to detection of a failure by said failure detecting logic, causes said filter driver to switch from network file system transfers to local file system transfers; and
   wherein in the absence of a successful write confirmation signal received by said receiving mechanism, said failure detecting logic generates a failure signal and in response thereto said fail-over invoking logic writes file system cache memory data for which a confirmation signal was not received to a physical storage media associated with said computing apparatus.

2. The computing apparatus of claim 1, further comprising:
   cache flush logic coupled to said processing logic and said memory write confirmation mechanism that is capable of flushing from said file system cache memory data written to a physical storage media owned by another computing apparatus coupled at said network adapter mechanism upon receipt of a successful memory write confirmation signal for the data from that other computer.

3. The computing apparatus of claim 2, further comprising:
   a file replication mechanism that replicates data in a physical storage media owned by another computing apparatus to a physical storage media associated with said computing apparatus; and
   wherein said cache flush logic does not flush file system cache memory data until a memory write confirmation signal for that data is received from the physical storage media associated with said computing apparatus.

4. The computing apparatus of claim 1, wherein said layered driver operating system includes a file system driver and said file system filter driver is provided between an application layer and said file system driver.

5. A computer system, comprising:
   a primary computer including
      first processing logic;
      a first layered driver operating system implemented by said first processing logic; and
      a first network adapter mechanism coupled to said first processing logic to permit said primary computer to communicate with another computer; and
   a secondary computer including
      second processing logic;
      a file system cache memory coupled to said second processing logic;
      a second layered driver operating system implemented by said second processing logic; and
      a second network adapter mechanism coupled to said second processing logic to permit said second computer to communicate with another computer;
   confirmation detection logic, included within said primary computer, coupled to said first processing logic for generating a confirmation signal to be sent to said secondary computer when data from said secondary computer is successfully written to a physical storage media having a file system owned by said primary computer;
   a file system filter driver, included within said second layered driver operating system, that performs a software implemented switch, when said confirmation signal is not received from said primary computer, from a first mode of operation in which data storage is achieved with a file system owned by said primary computer to a second mode of operation in which data storage is achieved with a file system owned by said secondary computer;
   failure detecting logic that detects failure in said primary computer; and
   fail-over invoking logic coupled to said second processing logic that in response to detection of a failure by said failure detecting logic, causes said filter driver to switch from network file system transfers to local file system transfers.

6. The computer system of claim 5, further comprising:

cache flush logic coupled to said second processing logic that flushes from said file system cache memory data written to a physical storage media owned by said primary computer upon receipt of a successful memory write confirmation signal for that data from primary computer.

7. The computer system of claim 6, further comprising:

a file replication mechanism that replicates data in a physical storage media owned by said primary computer to a physical storage media owned by said secondary computer; and wherein said cache flush logic does not flush file system cache memory data until a memory write confirmation signal for that data is received from the physical storage media owned by said secondary computer.

8. The computer system of claim 5, wherein said second layered driver operating system includes a file system driver and said file system filter driver is provided between an application layer and said file system driver.

9. A computing apparatus, comprising:

processing logic;

a file system cache memory coupled to said processing logic;

a layered driver operating system implemented by said processing logic;

a network adapter mechanism coupled to said processing logic to permit said computing apparatus to communicate with another computing apparatus;

a mechanism coupled to said processing logic that receives a successful memory write confirmation signal from another computer that owns a physical storage media to which data from said computing apparatus is stored in a first mode of operation;

cache flush logic coupled to said processing logic and said memory write confirmation mechanism that flushes from said file system cache memory data written to a physical storage media owned by another computing apparatus coupled at said network adapter mechanism upon receipt of a successful memory write confirmation signal for the data from that other computing apparatus;

a file system filter driver, included within said layered operating system, that is capable of performing a software implemented switch between said first mode of operation in which data storage is achieved using a network file system transfer and a second mode of operation in which data storage is achieved using a local file system transfer; and wherein the absence of a successful write confirmation signal received by said receiving mechanism causes said filter driver to switch from said first mode of operation to said second mode of operation.

10. The computing apparatus of claim 9, further comprising:

a file replication mechanism that replicates data in a physical storage media owned by another computing apparatus to a physical storage media associated with said computing apparatus; and wherein said cache flush logic does not flush file system cache memory data until a memory write confirmation signal for that data is received from the physical storage media associated with said computing apparatus.

11. The computing apparatus of claim 9, wherein said layered driver operating system includes a file system driver and said file system filter driver is provided between an application layer and said file system driver.

* * * * *